MARY J. & J. T. DEWEY.
Apparatus for Renovating Velvet, &c.
No. 142,088. Patented August 26, 1873.
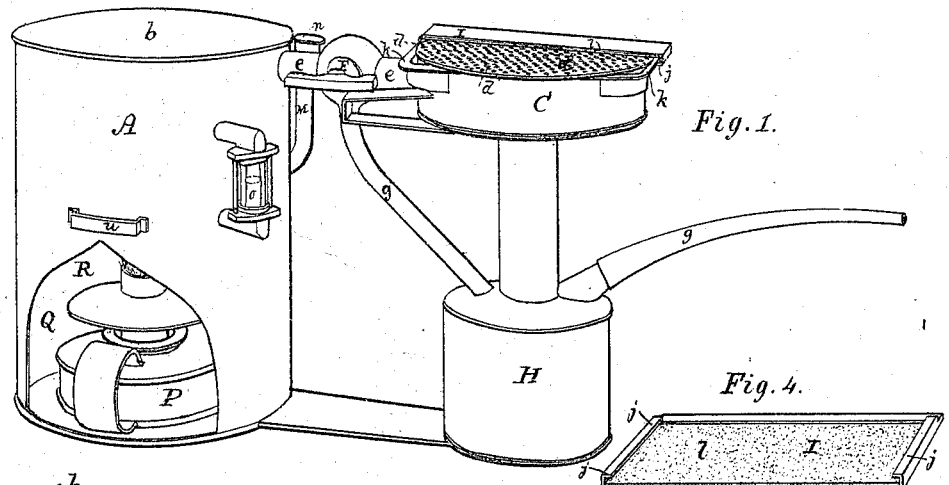
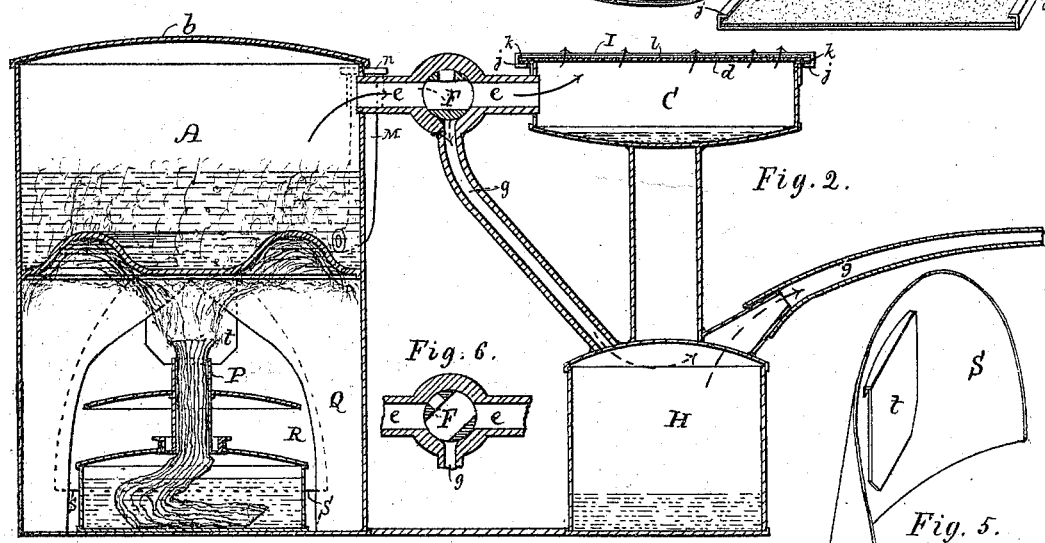
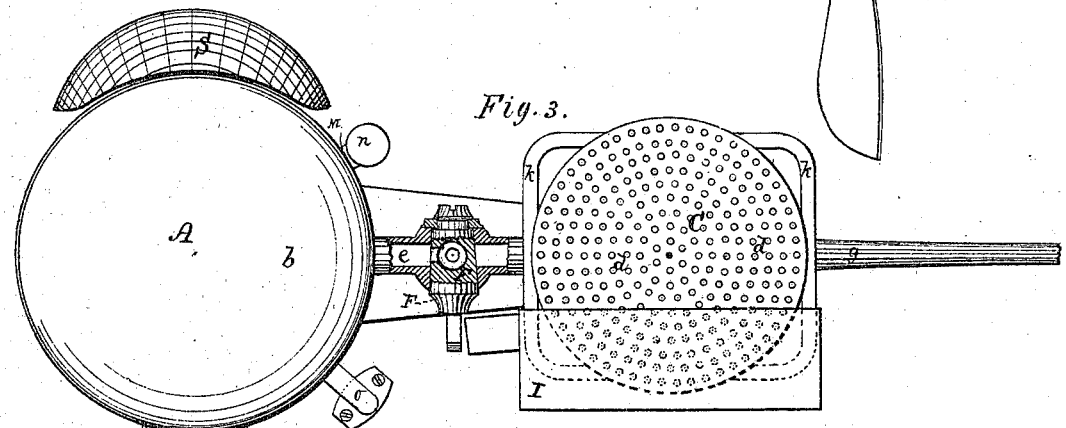

UNITED STATES PATENT OFFICE.

MARY J. DEWEY AND JAMES T. DEWEY, OF WEST TROY, N. Y., ASSIGNORS OF ONE-THIRD THEIR RIGHT TO HARRIET MARIA DEWEY, OF SAME PLACE.

IMPROVEMENT IN APPARATUS FOR RENOVATING VELVET, &c.

Specification forming part of Letters Patent No. 142,088, dated August 26, 1873; application filed March 8, 1873.

*To all whom it may concern:*

Be it known that we, MARY JANE DEWEY and JAMES THEODORE DEWEY, each of West Troy, in the county of Albany and State of New York, have jointly invented certain Improvements in Apparatus for Steaming, Drying, and Finishing or Renovating Worn or Wrinkled Pieces of Velvet, Lace, Crape, Ribbon, and other Fabrics, of which the following is a specification, reference being had to the accompanying drawing.

One part of our invention consists in the combination of a steam-generator having a smooth, closed, and wholly unobstructed top outer surface, a steam-chamber having its top or upper surface only finely perforated, and a steam pipe or passage leading from the said generator into the said perforated chamber below the said tops thereof, all arranged substantially as hereinafter described, and shown in the aforesaid drawing, so that pieces of worn or wrinkled velvet, ribbon, lace, crape, and similar fabrics can be conveniently and progressively first steamed, moistened, and rendered pliable over and by the steam escaping through the said perforated top of the steam-chamber, and next passed directly therefrom to and dried and finished over and against the unobstructed, steam-heated, smooth closed top of the generator, without any escape of steam or water from the bottom or under side of the said perforated steam-chamber, and without any interference or obstruction whatever by the pipe or passage which conducts the steam from the generator into the perforated chamber. Another part consists in the combination with the steam-generator having the closed smooth-surfaced top, the steamer having the perforated top, and the passage from the generator into the steamer, of a two-way valve-plug arranged in said passage, and a waste-steam passage leading therefrom and away from the generator and steamer, with or without a steam-condensing chamber in said waste-passage, whereby the steam may be conveniently made to pass from the generator either wholly through the perforated top of the steamer, or wholly through the waste-passage, or partly through the steamer and partly through the waste-passage, in various proportions, as is desirable in using the apparatus first to steam and then to dry different qualities of fabrics, and when various quantities of steam are produced by the generator. Another part consists in the combination, with the steam-chamber having the perforated top, of an adjustable or removable cover or covers, substantially as hereinafter described, whereby the steam can be temporarily prevented from escaping through a part or parts of the perforated top not covered by a ribbon or narrow fabric while the latter is being steamed. Another part consists in the combination, with the steam-generator having the closed smooth top and a heating-chamber, with an aperture or apertures in the side or sides thereof to permit the insertion and removal of a lamp for heating the generator, of a removable hood or hoods constructed and secured over the said aperture or apertures, substantially as hereinafter described, so that ribbons and similar fabrics, in the drying and finishing process on the top of the generator, will be prevented by said hood or hoods from falling down against or into the said aperture or apertures of the heating-chamber, and from being burned or scorched by flame or heat issuing therefrom, and at the same time the hood or hoods can be readily removed from and replaced over the said aperture or apertures to permit the removal and insertion of the lamp.

In the aforesaid drawing, Figure 1 is a perspective view of one form of our invention. Fig. 2 is a central vertical section, and Fig. 3 is a top view, partly in section, of the same apparatus; and Figs. 4, 5, and 6 represent parts thereof.

A is a steam-generator, having a closed smooth-surfaced top, *b*, which latter may be flat or in the form of a segment of a cylinder or cone, or preferably of a convex shape, as indicated in the drawing C is a chamber, which has a finely-perforated top, *d*, and which has communication with the generator A by a pipe or passage, *e*, so that steam will or may pass from the generator A through the pipe *e* into the chamber C, and thence in small jets through the holes in its top. F is a two-way valve-plug in a socket in the passage e, and g is a waste-passage leading away therefrom through a steam-condensing chamber, H. When the perforated plug F is turned into the position shown in Figs. 1 and 2, the steam then passes from the generator A wholly into the chamber C and out through its perforated top. When the plug F is set in the position shown in Fig. 3, the steam is wholly shut off from the chamber C and escapes slowly through the passage g, as is desirable when simply drying the fabric on the top b of the generator. When the valve F is turned into the position shown in Fig. 6, the steam then passes from the generator A partly into the steamer C, and partly into the passage g; and, by adjusting the plug F, more or less of the steam can be admitted either into the chamber c, or into the passage g, as may be desirable in steaming various fabrics.

A removable cover, marked I, for a part of the perforated top d of the steamer, is shown detached in Fig. 4. This cover has, at its ends, lugs or flanges j j, which are formed to engage with corresponding ribs or guides k k on the steamer, as shown in the drawing. Either one or two covers, I, can be used at once on the perforated top d, and can be adjusted thereon to cover more or less thereof, as shall be desirable in steaming ribbons and narrow fabrics of various widths. Each cover I has a yielding lining, l, of felt, vulcanized rubber, or other packing material, which will bear closely against the perforated plate d, and greatly prevent the escape of steam through the perforations under the cover.

M is a pipe, having a screw-cap, n, for use in supplying water to the generator; and o is a water-gage on the latter. P is a lamp in a chamber, Q, for heating the water and producing steam in the generator.

A burning jet of gas, or a small coal fire, may be used instead of the lamp P, which we generally prefer for portability.

R is an aperture in the side of the chamber Q, to permit the lamp to be inserted and removed. S is a removable hood, shown detached in Fig. 5, which is shaped to fit over the upper portion of the aperture R, and is secured there by the parts t and u, either one of which may be on the hood when the other is fast on the generator. In the drawing the part u is shown fast on the generator, and the part t fast on the hood; and the hood is thereby supported over the aperture R, so as to allow the lamp to burn freely, and, at the same time, prevent the escape of the flame or intensely-heated gases from the chamber Q against projecting and hanging parts of fabrics in the process of being dried and finished on the top b of the generator.

We commonly have two of the apertures R in the chamber Q, and a hood, S, to each.

In using the apparatus, we first produce steam in the generator, and place the hood or hoods S over the aperture or apertures R, and adjust the cover or covers I on the top d of the steamer, in case such hood or hoods, or cover or covers, shall be used, and then permit the steam to pass from the generator A, through the pipe e, into the chamber c, and out through the open portion of its perforated top. Then the piece of old or wrinkled velvet, crape, or other fabric to be renovated is placed upon, or held and moved over, the perforated top d, until the jets of steam issuing therefrom render the fabric sufficiently moist and pliable; whereupon the fabric is to be brushed or dressed into the proper condition, and placed or drawn over, and dried and finished against, the smooth steam-heated top b of the generator.

The steamer C and generator A are so combined that a ribbon, or other long, narrow fabric, can be conveniently steamed and moistened on the perforated top d, and simultaneously dried and finished on the smooth top b, progressively from one end to the other of the fabric.

What we claim as our invention is—

1. The combination of the steam-generator, having the smooth, closed, unobstructed top b, the steam-chamber C, having fine perforations in its top only, and the steam pipe or passage e below the said tops of the steam chamber and generator, all arranged as shown and described.

2. The combination of the steam-generator A, having the smooth closed top b, steam-chamber C, having the perforated top d, intervening steam-passage e, two-way valve-plug F, and waste-steam passage g, with or without the chamber H, substantially as described.

3. The combination of the adjustable cover or covers I, having the lugs or flanges j j and yielding lining l, with the steam-chamber C, having the perforated top d, and ribs or flanges k k, substantially as described.

4. The combination, with the steam-generator A, having the closed smooth-surfaced top b, heating-chamber Q, and aperture or apertures R, of the removable hood or hoods S, and the supporting devices t u thereof, as described.

MARY JANE DEWEY.
JAMES THEODORE DEWEY.

Witnesses:
AUSTIN F. PARK,
H. A. MERRITT.